United States Patent
Locker et al.

(10) Patent No.: US 8,898,688 B2
(45) Date of Patent: Nov. 25, 2014

(54) SYSTEM AND METHOD FOR DISTRIBUTED LOCAL CONTENT IDENTIFICATION

(75) Inventors: Howard Locker, Cary, NC (US); Michael Sievert, Yarrow Point, WA (US); Blake C. Ramsdell, Sammamish, WA (US); Robert D. Dickinson, III, Woodinville, WA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 918 days.

(21) Appl. No.: 12/494,470

(22) Filed: Jun. 30, 2009

(65) Prior Publication Data

US 2010/0131986 A1  May 27, 2010

Related U.S. Application Data

(60) Provisional application No. 61/116,972, filed on Nov. 21, 2008.

(51) Int. Cl.
| | |
|---|---|
| *H04N 21/24* | (2011.01) |
| *H04N 21/6332* | (2011.01) |
| *H04N 21/6543* | (2011.01) |
| *G06Q 30/02* | (2012.01) |
| *G08C 17/00* | (2006.01) |

(52) U.S. Cl.
CPC ............ *G08C 17/00* (2013.01); *G06Q 30/0254* (2013.01); *G06Q 30/0255* (2013.01)
USPC ............. 725/16; 725/116; 725/131; 725/107; 725/22

(58) Field of Classification Search
USPC ......................................................... 725/114
See application file for complete search history.

(56) References Cited

U.S. PATENT DOCUMENTS

| | | | |
|---|---|---|---|
| 6,018,768 | A | 1/2000 | Ullman et al. |
| 6,097,441 | A | 8/2000 | Allport |
| 6,240,555 | B1 | 5/2001 | Shoff et al. |
| 6,411,725 | B1 | 6/2002 | Rhoads |
| 6,446,261 | B1 | 9/2002 | Rosser |
| 6,496,981 | B1 | 12/2002 | Wistendahl et al. |
| 6,973,669 | B2 | 12/2005 | Daniels |

(Continued)

FOREIGN PATENT DOCUMENTS

| | | |
|---|---|---|
| CN | 1679051 A | 10/2005 |
| CN | 1989768 A | 6/2007 |

(Continued)

OTHER PUBLICATIONS

Website, 3 pages, available at http://en.wikipedia.org/wiki/Digital_video_fingerprinting, as of Jan. 21, 2011.

(Continued)

*Primary Examiner* — Bennett Ingvoldstad
(74) *Attorney, Agent, or Firm* — Ference & Associates LLC

(57) ABSTRACT

The invention provides systems and methods to identify local market media content utilizing a disturbed system and to determine what additional content is relevant in a self-aware, automatic way. A central location stores identification information and related content so in the future it is available if and when another user watches the same content. Therefore, the next time local market media content is played, it can be identified and additional related content can be quickly (e.g. in real time) made available.

15 Claims, 6 Drawing Sheets

(56) References Cited

U.S. PATENT DOCUMENTS

| | | | |
|---|---|---|---|
| 7,308,485 | B2 | 12/2007 | Roberts et al. |
| 7,421,376 | B1 | 9/2008 | Caruso et al. |
| 7,516,074 | B2 | 4/2009 | Bilobrov |
| 7,623,823 | B2 * | 11/2009 | Zito et al. ............... 455/2.01 |
| 7,975,225 | B2 | 7/2011 | Li et al. |
| 8,122,465 | B2 | 2/2012 | Davis et al. |
| 2001/0054181 | A1 | 12/2001 | Corvin |
| 2002/0092031 | A1* | 7/2002 | Dudkiewicz et al. ......... 725/138 |
| 2002/0162118 | A1 | 10/2002 | Levy et al. |
| 2003/0028882 | A1 | 2/2003 | Davis et al. |
| 2003/0093790 | A1* | 5/2003 | Logan et al. ................ 725/38 |
| 2003/0154481 | A1 | 8/2003 | Andersen et al. |
| 2003/0192060 | A1* | 10/2003 | Levy ............................ 725/133 |
| 2003/0229900 | A1 | 12/2003 | Reisman |
| 2004/0031058 | A1 | 2/2004 | Reisman |
| 2004/0117828 | A1 | 6/2004 | Parker et al. |
| 2005/0147256 | A1* | 7/2005 | Peters et al. ................ 381/56 |
| 2005/0210526 | A1 | 9/2005 | Levy et al. |
| 2005/0251823 | A1 | 11/2005 | Saarikivi |
| 2005/0264704 | A1 | 12/2005 | Leinonen |
| 2006/0218580 | A1* | 9/2006 | Bushnell ...................... 725/37 |
| 2007/0094703 | A1 | 4/2007 | Nygaard et al. |
| 2007/0130580 | A1* | 6/2007 | Covell et al. ................. 725/18 |
| 2007/0136804 | A1 | 6/2007 | Ohsawa et al. |
| 2007/0142101 | A1 | 6/2007 | Seshagiri et al. |
| 2007/0180461 | A1 | 8/2007 | Hilton |
| 2007/0250901 | A1 | 10/2007 | McIntire et al. |
| 2007/0300261 | A1 | 12/2007 | Barton et al. |
| 2008/0082510 | A1* | 4/2008 | Wang et al. .................. 707/3 |
| 2008/0089551 | A1 | 4/2008 | Heather et al. |
| 2008/0098433 | A1 | 4/2008 | Hardacker et al. |
| 2008/0127272 | A1 | 5/2008 | Cragun et al. |
| 2008/0244638 | A1 | 10/2008 | Ryden |
| 2008/0311963 | A1 | 12/2008 | Strawn |
| 2009/0077580 | A1* | 3/2009 | Konig et al. .................. 725/34 |
| 2010/0037264 | A1 | 2/2010 | Hardacker et al. |
| 2010/0049719 | A1 | 2/2010 | Payne et al. |
| 2010/0131363 | A1 | 5/2010 | Sievert et al. |
| 2010/0131847 | A1 | 5/2010 | Sievert et al. |
| 2010/0131979 | A1 | 5/2010 | Sievert et al. |
| 2010/0131997 | A1 | 5/2010 | Locker et al. |
| 2011/0072480 | A1 | 3/2011 | Stone |

FOREIGN PATENT DOCUMENTS

| | | | |
|---|---|---|---|
| CN | 101053164 | A | 10/2007 |
| CN | 101073050 | A | 11/2007 |
| CN | 101120377 | A | 2/2008 |
| CN | 101543009 | A | 9/2009 |
| CN | 101656062 | A | 2/2010 |
| EP | 1023807 | | 7/2002 |
| WO | 2010027784 | A2 | 3/2010 |

OTHER PUBLICATIONS

Website, 1 page, available at http://www.digitalsmiths.com, as of Feb. 4, 2011.
"automatic" definition, Oxford English Dictionary, http://oed.com/view/Entry/13464, accessed Apr. 12, 2012 by U.S. Patent & Trademark Office, U.S. Appl. No. 12/494,539, Final Office Action mailed Apr. 17, 2012, 15 pages.
Stronczer, Ryan S., Non-Final Office Action in U.S. Appl. No. 12/415,638, USPTO (Aug. 3, 2011) (8 pages).
Sievert, Michael, Amendment in Response to Non-Final Office Action in U.S. Appl. No. 12/415,638, (Nov. 3, 2011) (13 pages).
Stronczer, Ryan S., Final Office Action in U.S. Appl. No. 12/415,638, USPTO (Feb. 29, 2012) (10 pages).
Sievert, Michael, Request for Reconsideration in Response to Final Office Action in U.S. Appl. No. 12/415,638, (Apr. 30, 2012) (11 pages).
Stronczer, Ryan S., Advisory Action in U.S. Appl. No. 12/415,638, USPTO (May 30, 2012) (3 pages).
Sievert, Michael, RCE Amendment in Response to Advisory Action in U.S. Appl. No. 12/415,638, (Jul. 30, 2012) (14 pages).
Stronczer, Ryan S., Non-Final Office Action in U.S. Appl. No. 12/415,638, USPTO (Nov. 21, 2012) (8 pages).
Sievert, Michael, Response to Non-Final Office Action in U.S. Appl. No. 12/415,638, (Mar. 21, 2013) (14 pages).
Stronczer, Ryan S., Final Office Action in U.S. Appl. No. 12/415,638, USPTO (Jul. 11, 2013) (10 pages).
Sievert, Michael, RCE Amendment in Response to Final Office Action in U.S. Appl. No. 12/415,638, (Oct. 11, 2013) (13 pages).
Stronczer, Ryan S., Non-Final Office Action in U.S. Appl. No. 12/415,638, USPTO (Mar. 26, 2014) (9 pages).
Kurien, Christen A., Non-Final Office Action in U.S. Appl. No. 12/463,020, USPTO (Apr. 3, 2012) (14 pages).
Locker, Howard, Response to Non-Final Office Action in U.S. Appl. No. 12/463,020, (Aug. 3, 2012) (13 pages).
Kurien, Christen A., Final Office Action in U.S. Appl. No. 12/463,020, USPTO (Dec. 5, 2012) (16 pages).
Locker, Howard, RCE Amendment in Response to Final Office Action in U.S. Appl. No. 12/463,020 (Apr. 5, 2013) (12 pages).
Kurien, Christen A., Non-Final Office Action in U.S. Appl. No. 12/463,020, (Sep. 17, 2013) (11 pages).
Locker, Howard, Response to Non-Final Office Action in U.S. Appl. No. 12/463,020, (Dec. 17, 2013) (12 pages).
Kurien, Christen A., Final Office Action in U.S. Appl. No. 12/463,020, USPTO (Jan. 15, 2014) (13 pages).
Ahmed, Affaf, Non-Final Office Action in U.S. Appl. No. 12/494,507, USPTO (Jan. 31, 2012) (10 pages).
Sievert, Michael, Amendment in Response to Non-Final Office Action in U.S. Appl. No. 12/494,507, (Apr. 30, 2012) (11 pages).
Ahmed, Affaf, Final Office Action in U.S. Appl. No. 12/494,507, USPTO (Jul. 5, 2012) (9 pages).
Sievert, Michael RCE Amendment in Response to Final Office Action in U.S. Appl. No. 12/494,507, (Oct. 5, 2012) (10 pages).
Ingvoldstad, Bennett, Non-Final Office Action in U.S. Appl. No. 12/494,539, USPTO (Sep. 27, 2011) (10 pages).
Sievert, Michael, Amendment in Response to Non-Final Office Action in U.S. Appl. No. 12/494,539, (Jan. 27, 2012) (20 pages).
Ingvoldstad, Bennett, Final Office Action in U.S. Appl. No. 12/494,539, USPTO (Apr. 17, 2012) (12 pages).
Sievert, Michael, RCE Amendment in Response to Final Office Action in U.S. Appl. No. 12/494,539, (Jul. 17, 2012) (14 pages).
Ingvoldstad, Bennett, Non-Final Office Action in U.S. Appl. No. 12/494,539, USPTO (Jan. 31, 2014) (15 pages).
Locker, Howard, RCE Amendment in Response to Final Office Action in U.S. Appl. No. 12/463,020, (Apr. 15, 2014) (12 pages).
Sievert, Michael, Amendment in Response to Non Final Office Action in U.S. Appl. No. 12/494,539, (Apr. 30, 2014) (13 pages).
Fogg, Cynthia M., Final Office Action in U.S. Appl. No. 12/494,539, USPTO, Aug. 14, 2014, (16 pages).
Stronczer, Ryan S., Final Office Action in U.S. Appl. No. 12/415,638 (Sep. 8, 2014), 10 pages.
Osman Bilal Ahmed, AFAF, Non Final Office Action in U.S. Appl. No. 12/494,507 (Sep. 29, 2014), 7 pages.

* cited by examiner

US 8,898,688 B2

SYSTEM AND METHOD FOR DISTRIBUTED LOCAL CONTENT IDENTIFICATION

CLAIM FOR PRIORITY

This application claims priority from U.S. Provisional Patent Application No. 61/116,972, filed Nov. 21, 2008, which is fully incorporated by reference herein.

FIELD OF THE INVENTION

The invention is directed to systems and methods for multimedia management. Specifically, the invention is directed to devices, systems and methods for distributed local content identification.

BACKGROUND OF THE INVENTION

An increasing number of households now have high definition televisions (HDTVs) and broadband Internet connections. Consumers watch a significant amount of television on these HDTVs. Consumers are also increasingly accessing media content via the Internet, primarily on traditional desktop and laptop computers, as well as mobile computing devices and the like. These trends are very likely to continue as more HD programming becomes available, more consumers buy HDTVs, and more consumers switch to or obtain wired or wireless broadband Internet connections.

Consumers commonly use computing and mobile devices to augment their television watching experiences (such as when using a laptop to track election results or sports scores while watching related content on the television). This trend is also likely to continue, as consumers are constantly seeking out additional information related to a television program, even while watching the programming. Advances in television services and Internet media content related to television services have facilitated this behavior. Ever increasing and accessible ways of manipulating television programs are becoming available (e.g. picture in picture displays, pausing live programs via digital video recorders (DVRs) and the like, etc.). Likewise, increasing amounts of Internet media content related to television programs is becoming available.

However, there is currently no conventional way for allowing a user to have a truly integrated television and Internet media experience. Even when watching television programs on an Internet-connected device (e.g. laptop, desktop or mobile computing devices), a truly integrated experience is lacking, as consumers must choose between watching the program or browsing the Internet. Consequently, consumers resort to switching between media devices (e.g. between television and laptop) or applications manually, in a time consuming and disjointed fashion.

Moreover, there are numerous local media markets that offer local programming content. For example, in the United States alone there are over two hundred local television markets. Program content varies across markets, lending to difficulties in providing an integrated television and Internet media experience with regard to these local markets, particularly with regard to identification of local market media content and obtaining related media content.

Accordingly, the inventors have recognized a need for an integrated system that is capable of providing an integrated multi-media experience and overcomes the above mentioned shortcomings of conventional arrangements.

SUMMARY OF THE INVENTION

At least on presently preferred embodiment of the invention provides systems and methods to identify local market media content utilizing a disturbed system and determine what additional content is relevant in a self-aware, automatic way. Information necessary to identify local market media content is captured by a local device and sent to a central location and utilized to obtain related content so in the future this information and content is available if and when another user accesses (e.g. watches) the same local market media content. Therefore, the next time the local media market content (e.g. local television market media) is played by a user within the distributed system, it can be identified and additional related content can be quickly (e.g. in real time) made available.

In summary, on aspect of the invention provides an apparatus comprising: one or more processors; a program storage device tangibly embodying a program of instructions that when executed by the one or more processors enables the apparatus to: receive information necessary for identification of local market media content from one or more remote devices; and provide related content to the one or more remote devices based on the identification of local market media content.

Another aspect of the invention provides a method comprising: receiving at an electronic device information necessary for identification of local market media content from one or more remote devices; and provide related content to the one or more remote devices based on the identification of local market media content.

A further aspect of the invention provides an apparatus comprising: one or more processors; a program storage device tangibly embodying a program of instructions that when executed by the one or more processors enables the apparatus to: capture information necessary for identification of local market media content from a component media source; provide the information necessary for identification of local market media content to a remote device; and receive related content from the remote device based on the identification of local market media content.

Another aspect of the invention provides a tangible program storage device, readable by machine, embodying a program of instructions that when executed by a processor of the machine enable the machine to: capture information necessary for identification of local market media content from a component media source; provide the information necessary for identification of local market media content to a remote device; and receive related content from the remote device based on the identification of local market media content.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE INVENTION

Figure 1:
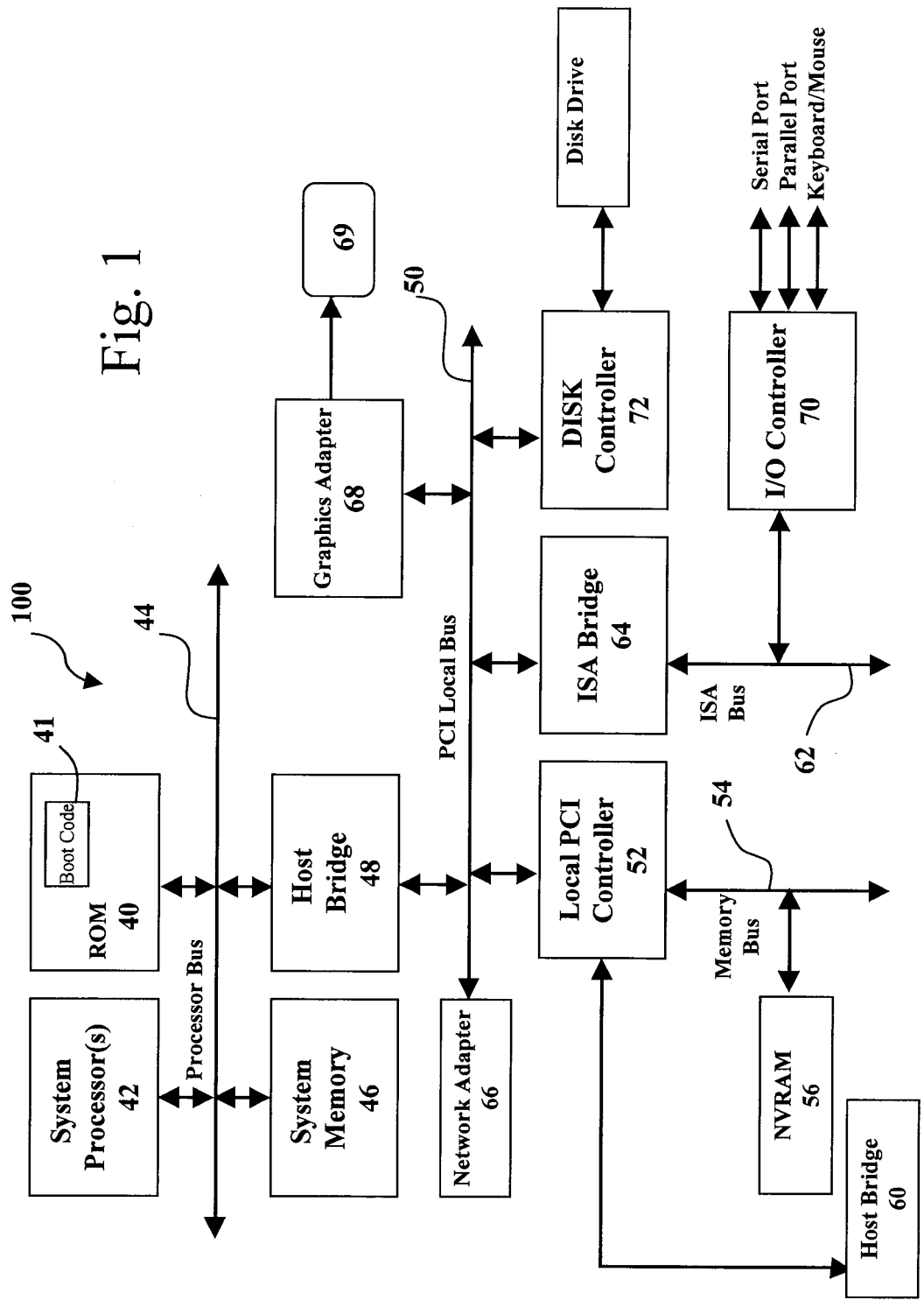
FIG. 1 illustrates a block diagram of a computer system.

It will be readily understood that the components of the present invention, as generally described and illustrated in the figures herein, may be arranged and designed in a wide variety of different configurations in addition to the described presently preferred embodiments. Thus, the following more detailed description of the embodiments of the present invention, as represented in the figures, is not intended to limit the scope of the invention, as claimed, but is merely representative of selected presently preferred embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings. The following description is intended only by way of example, and simply illustrates certain selected presently preferred embodiments of the invention as claimed herein.

Users of multiple media devices need a way to have an integrated media experience where program content can be identified and additional, related content can be automatically generated. Existing content identification systems provide identification (e.g. via digital fingerprinting) of known video content using time consuming and complex fingerprinting algorithms. In contrast, co-pending and commonly owned U.S. patent application Ser. No. 12/415,638, filed Mar. 31, 2009, incorporated by reference here, provides some useful information regarding a media management system that quickly identifies source media content and provides targeted, related media based upon the identification (e.g. in real time). Notwithstanding, a problematic area is encountered when identifying local content, for example, in connection with a plurality of local media markets, where relevant comparison information may not yet be available.

Considering that each local media market in a country has unique (localized) media content (e.g. a local TV program) that is only available in that market, centralized identification is a complex task. Common examples of local market media content include but are not limited to local news and/or local commercials. To leverage an identification result useful in obtaining related content for a particular local market, one must first properly identify the media from the local market. For national television programs, all that is needed is a single component capable of receiving the national broadcasts. In contrast, to identify local market media content, this single component would need to be replicated in each local market. Having dedicated systems (e.g. data centers) capable of identifying programming (e.g. via digital fingerprinting) in each local market and storing this information in the data centers is time consuming and expensive.

Accordingly, at least one embodiment of the invention provides systems and methods for utilizing a distributed network of media management systems for obtaining information necessary to identify local market media content. A computer of a particular media management system located in a particular local market provides information necessary for identification of local market media content to a remote data center. Similarly, media management systems in other local markets provide other local identification information. Subsequently, other users within the system (having access to the contents of the data center, e.g. via a network connection) are enabled to easily and quickly obtain identification results and targeted, related content for unique local market media content (e.g. in real time).

The media management systems distributed throughout a variety of local markets can be utilized to send identification information to a data center as the user watches a program. The users of media management systems can opt in to provide local market media content identification as they watch programming in a local market. Alternatively, users can also opt to have their media management systems be instructed to gather identification information proactively by a data center during system down time. The identification information gathered by the media management systems is collected at the data center, utilized in gathering related content, and made available to other users within the distributed system.

Referring now to FIG. 1, there is depicted a block diagram of an illustrative embodiment of a computer system 100. The illustrative embodiment depicted in FIG. 1 may be a notebook computer system, such as one of the ThinkPad® series of personal computers sold by Lenovo (US) Inc. of Morrisville, N.C. or a workstation computer, such as the Thinkstation®, which is also sold by Lenovo (US) Inc. of Morrisville, N.C. As will become apparent from the following description, however, the present invention is applicable to operation by any appropriately configured data processing system or other electronic device.

As shown in FIG. 1, computer system 100 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a keyboard, mouse, and a disk drive. In addition, I/O controller 70 supports external communication by computer system 100 via serial and parallel ports. The USB Bus and USB Controller (not shown) are part of the Local PCI controller (52).

Figure 2:
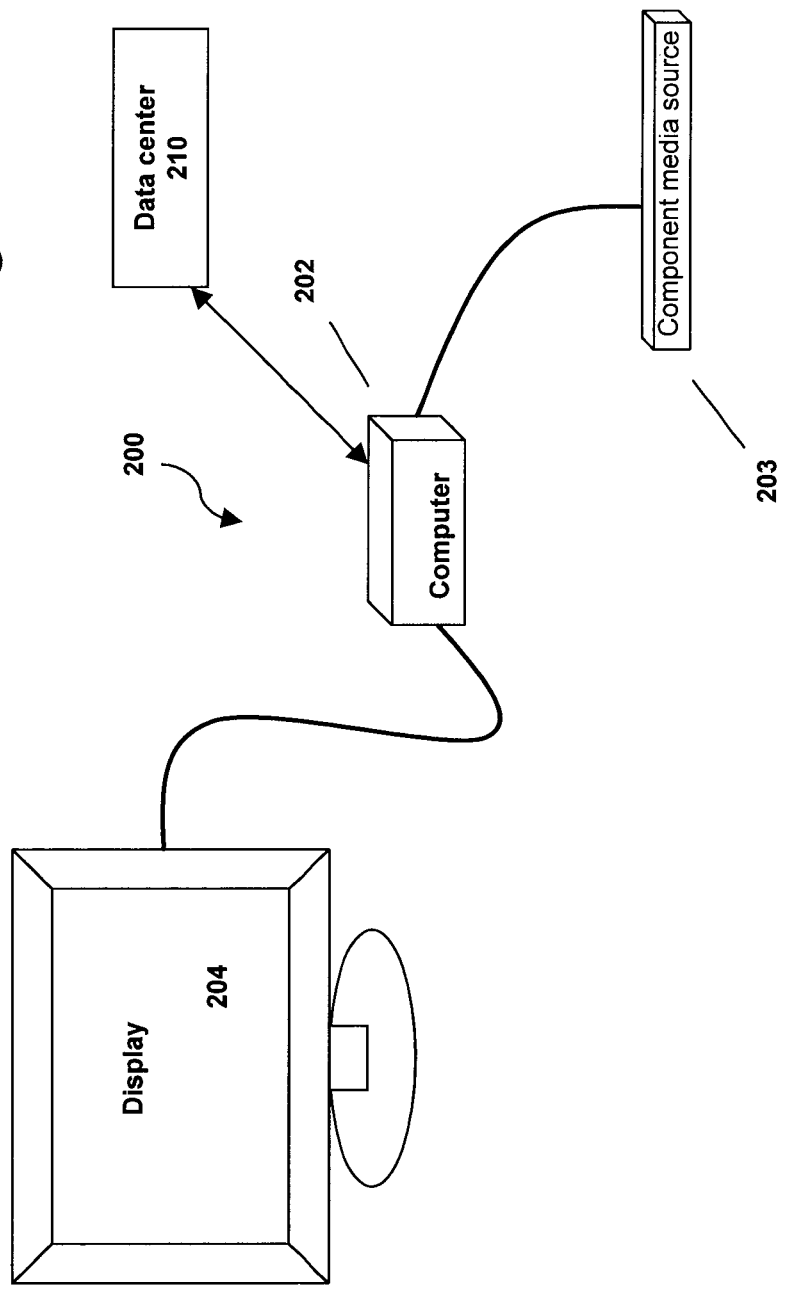
FIG. 2 illustrates a media management system.

FIG. 2 depicts a non-limiting example of a media management system 200 configured according to one embodiment of the invention. The computer system 100 described above is for example a computer 202 of media management system 200. As shown, a component media source 203 (e.g. cable TV box, satellite receiver, etc.) is connected to the computer 202, which is in turn connected to at least one display 204 (e.g. HDTV set, computer monitor, etc.). A user first plugs his or her existing component media source 203 into the computer 202. The component media source 203 may provide uncompressed digital data via a high definition multimedia interface (HDMI) or other digital or analog connection types. Then, the user plugs the computer 202 into the display device 204. The media management system is appropriately connected (e.g. via network connection) to a remote data center (210).

It is assumed in this example that an overlay passthrough device (OPD) (not shown) is provided within or external to the computer 202, though more than one OPD could be provided as external components operatively connected to the computer 202, e.g. in a home network environment. The OPD enables information capturing, identification and selective combined display of media from the component source 203 and related content, possibly derived from a remote source such as data center (210). Exemplary arrangements for identifying, obtaining and overlaying various media content types are described in co-pending and commonly owned U.S. patent application Ser. No. 12/415,638, filed on Mar. 31, 2009, and Ser. No. 12/463,020, filed on May 8, 2009, both of which are incorporated by reference herein.

The media management system 200 enables the user to accomplish the identification of local market media content, retrieval and display of related content selectively, without requiring the media management system computer 202 to act as the TV tuner. This simplifies the set up of the system and allows the users to continue utilizing a conventional TV configuration with which they have become familiar. In other words, the component media source (203) (e.g. a cable TV box or satellite TV box) is seamlessly integrated into the media management system 200, rather than being replaced by a complex, media management system specific tuner.

Figure 3:
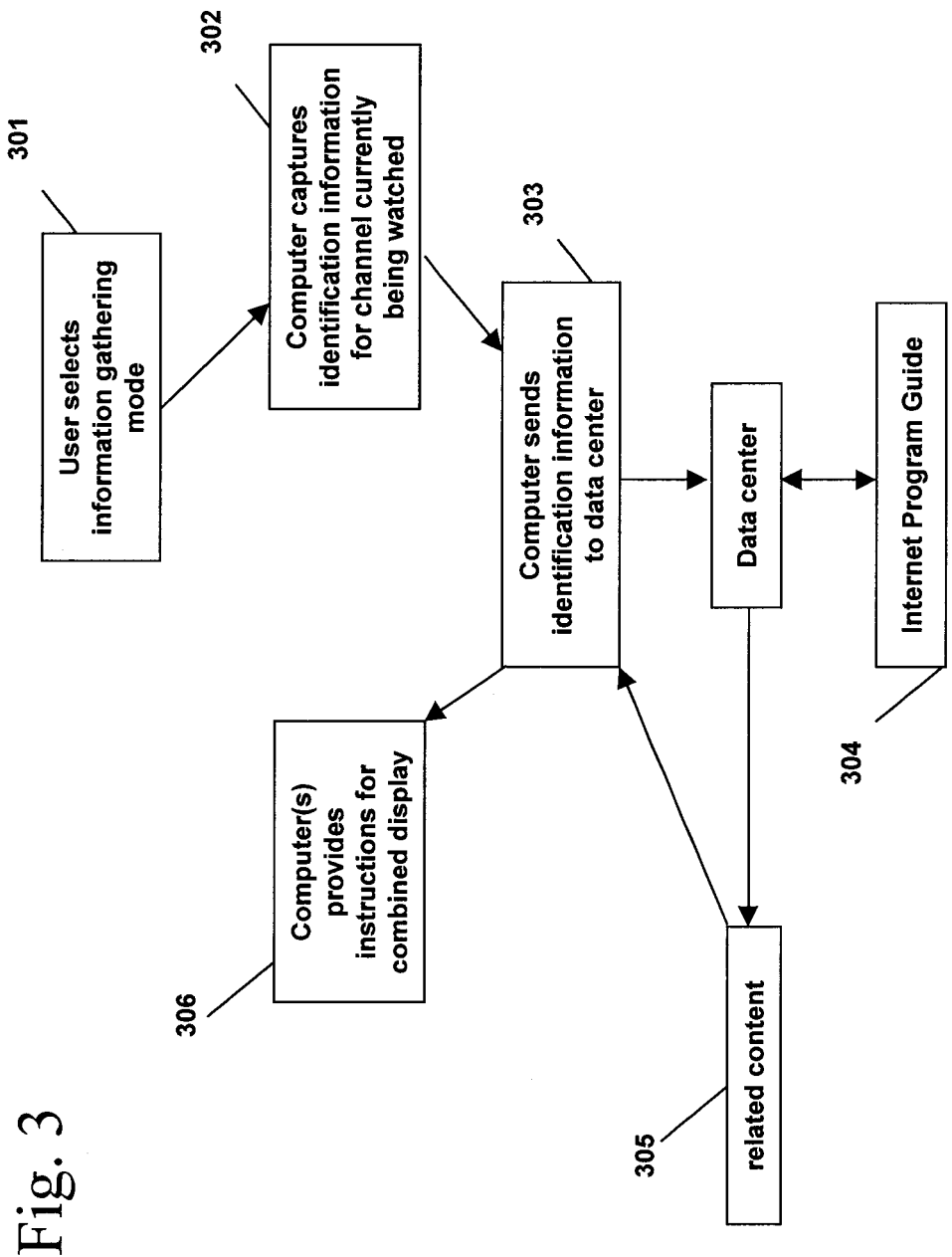
FIG. 3 illustrates a user initiated information-gathering mode.

FIG. 3 illustrates a high level view of an exemplary and non-limiting user initiated information-gathering mode. At least one presently preferred embodiment of the invention utilizes media management systems (e.g. media management system 200) located in various local markets to identify local market media content (e.g. TV programs, commercial content, etc.) in a distributed way as users watch programming. FIG. 3 illustrates the scenario for a particular media management system located in a particular local market.

As illustrated in FIG. 3, local market media content is being presented (or played, or shown) from a component media source (e.g. a cable TV box). At 301, upon user selection (e.g. via universal remote control), the computer has access to the local market media content (e.g. a local TV news program) input via a component media source (e.g. cable TV box). At 302 the computer periodically captures from the local market media content identification information necessary to produce an identification result. The information can be captured for example by buffering a frame into a frame buffer or a hard drive of the computer. The actual generation of an identification result can be done locally (e.g. at the media management system computer) or remotely (e.g. at a network connected data center), though in this example it is conduced remotely.

The captured information necessary for identifying the local media market content is in this example a watermark, such as a broadcaster's watermark. A watermark can be used, in combination with additional information (e.g. the time of day and the geographic location of the media management system, as determined via an IP addressing scheme) to properly identify the broadcaster originating the local media market content. A store of watermarks can be maintained for comparison (e.g. at the data center) with the captured watermark information (e.g. via digital fingerprinting). With this information, it can be determined which channel is currently being watched, when, and in what area. Thereafter, the identity of the local media market content (e.g. program title) can be determined (e.g. via consulting an online programming guide).

At 303, the computer sends the captured identification information to the remote data center. The data center preferably conducts the analysis necessary to produce an identification result, as above, which can include for example consulting an Internet program guide at 304. Once the identification result has been obtained, the data center can optionally provide related content back to the computer that sent the identification information at 305. At 306, the computer provides instructions for optional combined display of the component source media and the related content. Thus, the identification information captured and sent by the computer can be utilized by the data center to obtain the identification result and/or obtain related content and provide it to the capturing media management system. The data center will store the identification information, the identification result, and the related content for subsequent use by additional media management systems, as further described below.

The process of capturing the information necessary to produce an identification result with the computer can vary depending upon the use context encountered. Further non-limiting examples are outlined below, including but not limited to situations where a user is currently watching programming with the media management system and where the user is not currently watching programming with the media management system (i.e. system down time).

In the context where a user is currently using the media management system to watch a program and selects entry into the information gathering mode (e.g. step 301), the computer will be receiving input from the component media source (e.g. cable TV box). This input can be buffered to an appropriate location (e.g. hard drive of the computer or a frame buffer).

The identification information captured in this context can also include but is not limited to closed caption data. For example, closed caption data from the input signal from the component media source can be extracted and utilized as fingerprinting data. The computer (or remote device e.g. data center, etc.) can extract key words from the closed captioning data. These key words can be utilized for example to generate an Internet query (conducted either by the computer of the media management system or a remote device such as the data center). The results of this query, i.e. related content, can then be associated with the fingerprint and thus the input programming content. This related content can then be returned to the capturing media management system and/or stored in the data center for use by subsequent media management systems.

It should also be noted that the identification information captured can also include but is not limited to audio data. The audio data can be converted, for example, into text. This text, derived from input audio can be utilized similar to the closed caption data, as described herein.

The identification information captured by the computer, as described above, can be analyzed in more detail at the central location (e.g. data center), if desired. For example, it may be advantageous to manually analyze the video content to create special content (e.g. targeted advertising) that generates revenue when the program is identified by subsequent media management systems in the distributed system. More detailed processing (over and above what is accomplished utilizing the computer of the media management system) can be performed at the data center to create additional relevant information for the particular identified program. Again, the above-described process is user selectable, which may have privacy related advantages.

Figure 4:
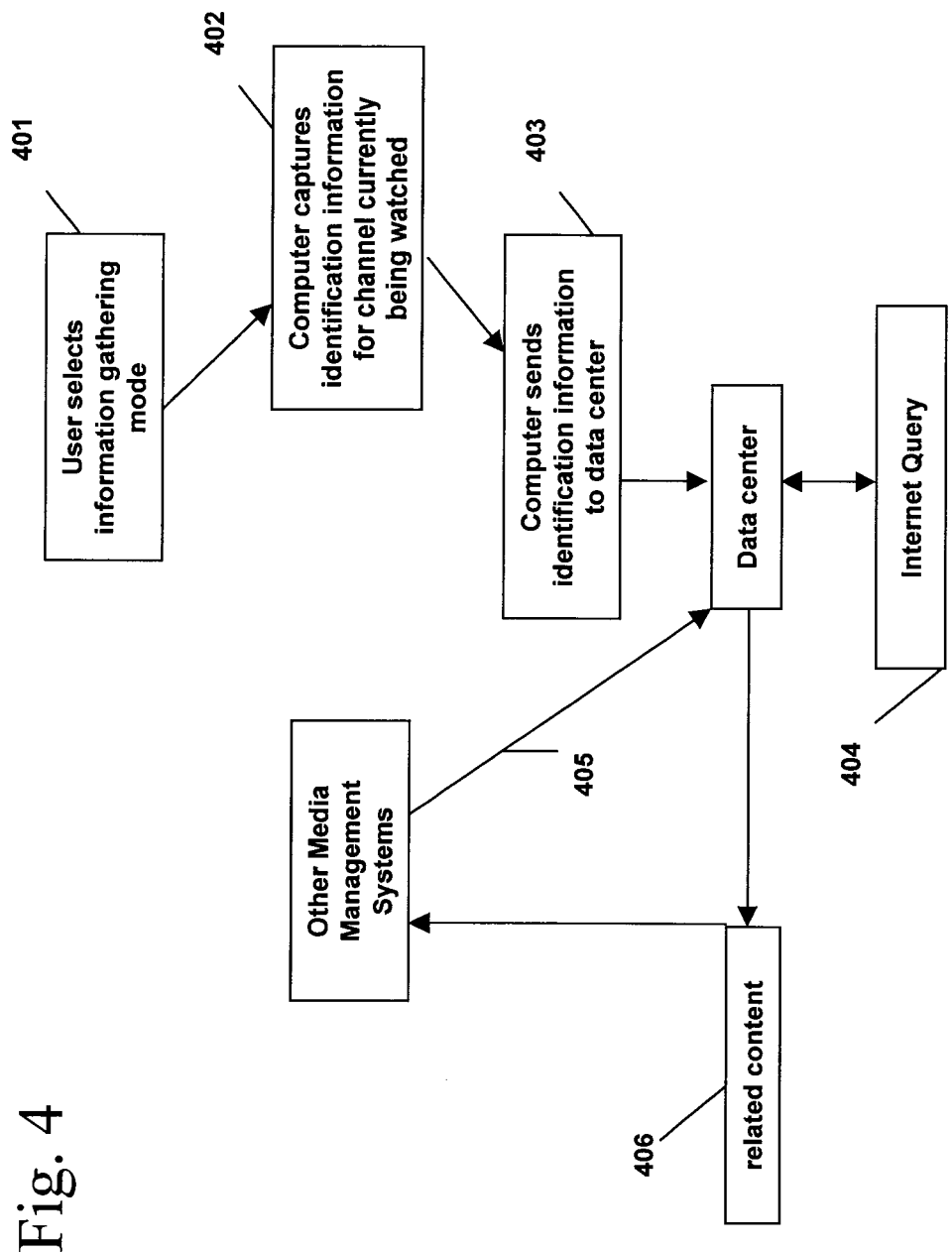
FIG. 4 illustrates obtaining identification information by other media management systems.

FIG. 4 illustrates the use of previously captured identification information by other media management systems within the same local market. Similar to the process described in FIG. 3, at 401, a user can opt to permit a locally situated media management system to capture information 402 input from a component media source for a particular channel. This captured identification information can include but is not limited to closed caption data, as discussed above. The computer can transmit the identification information to the data center at 403. As discussed, the data center can conduct and Internet query at 404, e.g. utilizing key words extracted from the closed captioning data. The data center can then associate the identification information with the related content obtained via the Internet query and store the same. Thus, when other media management systems provide the same identification information (e.g. captured from their component media sources) to the data center, related content previously obtained will be available automatically. Thus, the data center can return this related content at 406 to the other media management systems.

According to an embodiment of the invention, a universal remote control is configured to enable control (via the computer) of the component media source to provide the computer with input when the system is not being utilized by the user (system down time). The universal remote is configured such that the computer can communicate with the component media source using wireless technology (e.g. IR blaster). This concept is preferably extended such that the central location (e.g. data center) can instruct the computer as to which channel to gather information for. The data center can check its database for channels for which it does not currently have local programming information and/or related content available and instruct an appropriately situated media management system to enter the information-gathering mode. The data center is configured to send an appropriate command to the chosen media management system computer to cause the component media source (e.g. via the remote control) to tune to the appropriate channel.

Figure 5:
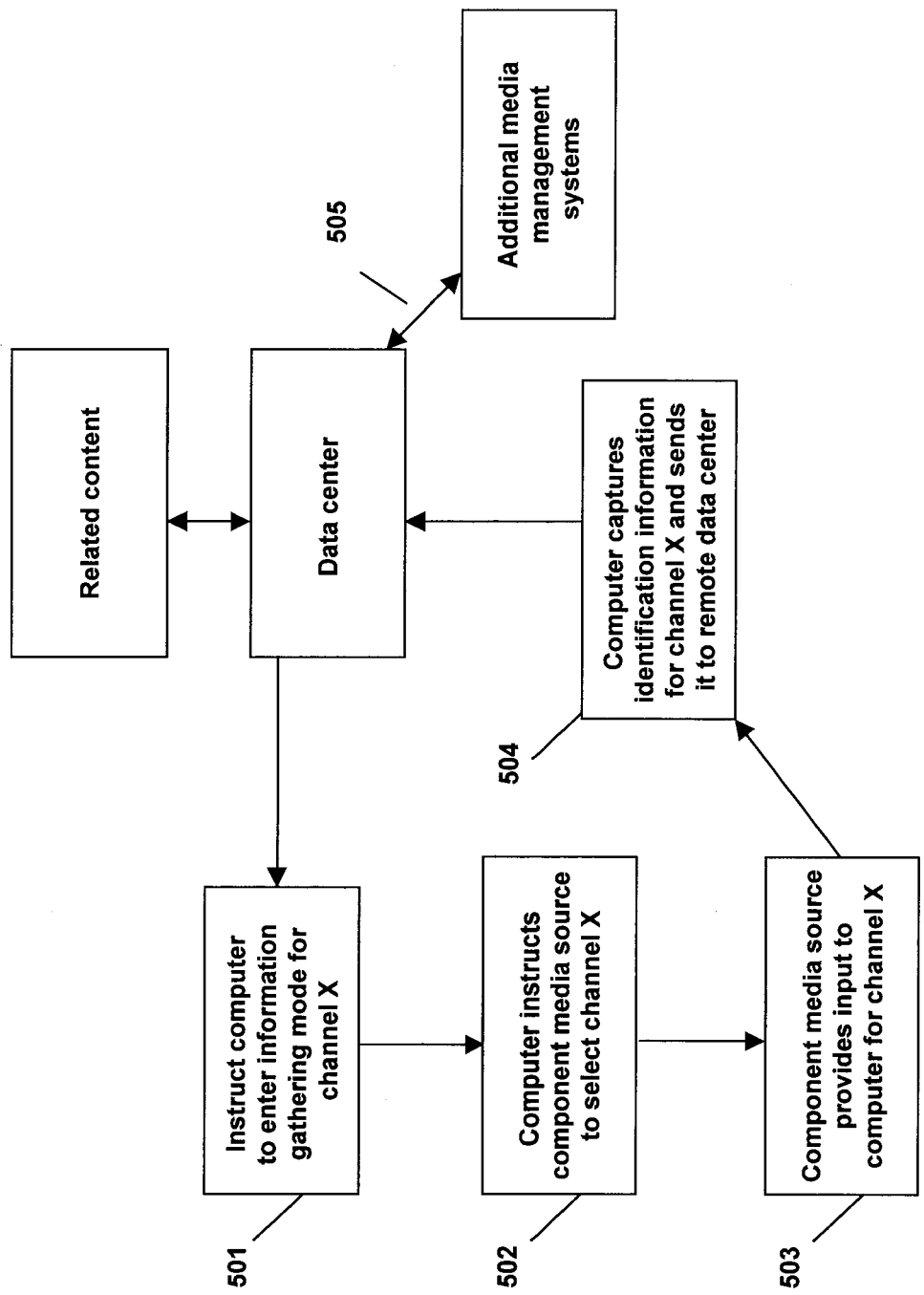
FIG. 5 illustrates a data center initiated information-gathering mode.

FIG. 5 illustrates a scenario wherein the data center instructs an appropriately situated media management system to enter the information-gathering mode. As shown, the data center passes the appropriate command via a network connection to the computer located in the local market of interest at 501. The computer of the media management system in turn instructs the component media source to a desired channel (e.g. channel X) at 502. Again, this may be accomplished for example utilizing a universal remote and IR communication, though other communication means would be suitable. The component media source will then provide input (local market media content) to the computer from the desired channel at 503. Similar to the process described in FIG. 4, the computer will then capture the necessary identification information at 504 and send it to the data center. Accordingly, the data center will be in possession, at a minimum, of information necessary for identification of the local market program (e.g. currently being broadcast on channel X) being captured by the computer. Preferably the information necessary for identification will include information needed to gather related content as well (e.g. closed captioning data used to conduct an Internet query), as the channel and time (and thus the identity of the program) will be available (e.g. via consultation of an Internet programming guide). The data center will thus be capable of providing this related content automatically to additional media management systems at 505 when they watch the same local market media content.

Figure 6:
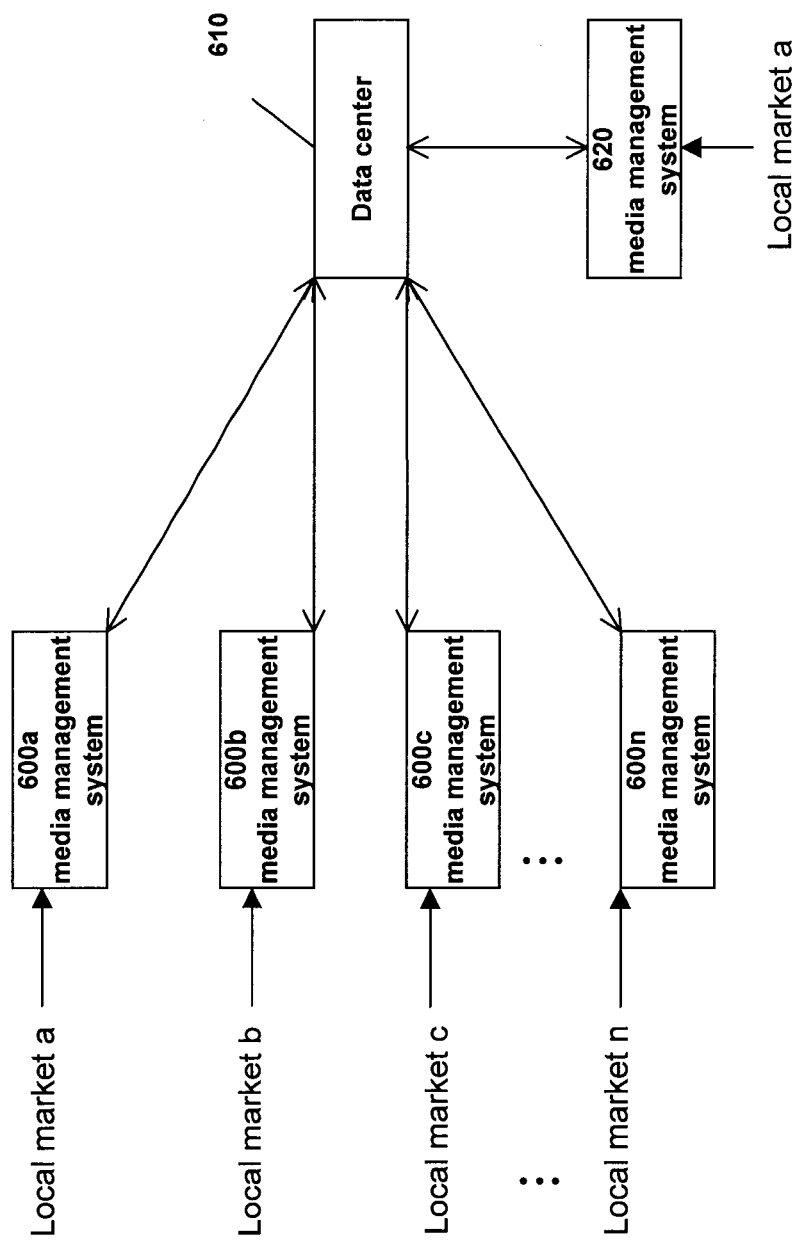
FIG. 6 illustrates a distributed system for identification of local media content.

A distributed media management system is illustrated in FIG. 6. In FIG. 6 the local markets are represented by local markets a, b, c . . . n. The media management systems are represented by 600a, 600b, 600c . . . 600n, corresponding to a plurality of media management systems (as previously discussed) situated within the separate local markets. Any of the plurality of distributed media management systems 600a, 600b, 600c . . . 600n can be utilized to provide a remote data center 610 with identification information for local market media.

As above, the gathering of identification information can occur either while the user is watching the programs or as instructed by the data center 610. Once identification is made, it can be stored in the data center 610 and made available to one or more subsequent users 620, as in this example another user situated in local market a. Thus, the data center 610 can proactively obtain related content based on the identification result obtained, making more related content available quickly to a subsequent user 620 within the system.

As a non-limiting example, a user of a particular media management system (e.g. 600a) could opt to allow his or her system to be instructed during down time to capture and send identification information by a central data center 610. It is presently preferred that the data center 610 can instruct any one of a plurality of distributed media management systems to gather local market media identification information during system downtime, as the data center 610 can determine local markets (and channels, programs, etc., thereof) for which it needs identification information. The data center 610 is thus particularly suited for instructing a particular media management system (e.g. 604a) to capture input from the component media source (e.g. cable TV box) for a specific channel, program, etc.

As above, the data center 610 can conduct further operations as desired. For example, the data center 610 is configurable to allow manual editorial additions, etc., to the automatically generated related content. Thus, the related content provided could be refined and customized over time for the particular local market media content (e.g. local news program) thus identified. Subsequently, another media management system 620 in local market a, in operative connection with data center 610, will have the local market identification information and related content already available to it based on the previous identification and retrieval.

In brief recapitulation, at least one embodiment of the invention provides local content identification by utilizing a distributed media management system. The invention provides identification of unique local market content and makes this identification information as well as other related content proactively available to users within the distributed system.

It should be understood that many of the functional characteristics of the inventive system described in this specification may be implemented as modules. Modules may include hardware circuits such as one or more processors with memory, programmable logic, and/or discrete components. The hardware circuits may perform hardwired logic functions, execute computer readable programs stored on tangible storage devices, and/or execute programmed functions. The computer readable programs may in combination with a computer system and the other described elements perform the functions of the invention.

It will be readily understood by those having ordinary skill in the art that embodiments of the present invention may take the form of an entirely hardware embodiment or an embodiment containing both hardware and software elements. An embodiment that is implemented in software may include, but is not limited to, firmware, resident software, microcode, etc.

The computer readable programs may be stored in tangible computer/machine-readable (apparatus readable) medium. Examples of a computer/machine-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Accordingly, elements of the present invention may be implemented on at least one computer running suitable software programs. These may also be implemented on at least one Integrated Circuit or part of at least one Integrated Circuit. Thus, it is to be understood that the invention may be implemented in a combination of both hardware and software. Again, computer/machine-readable programs may in combination with a computer system perform the functions of the invention.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

In the drawings and specification there has been set forth a preferred embodiment of the invention and, although specific terms are used, the description thus given uses terminology in a generic and descriptive sense only and not for purposes of limitation.

If not otherwise stated herein, it is to be assumed that all patents, patent applications, patent publications and other publications (including web-based publications) mentioned and cited herein are hereby fully incorporated by reference herein as if set forth in their entirety.

What is claimed is:

1. An apparatus comprising:
   one or more processors;
   a program storage device tangibly embodying a program of instructions that when executed by the one or more processors enables the apparatus to:
   instruct one or more remote devices to enter an information-gathering mode to gather information necessary for identification of local market media content in a particular local media market, wherein the apparatus instructs one or more remote devices to enter the information-gathering mode to gather information necessary for identification of the local market media content on a particular channel in the particular local media market during down time of the one or more remote devices;
   receive information necessary for identification of the local market media content from the one or more remote devices, the one or more remote devices obtaining the information necessary for identification of the local market media content via an input of a connected component media source; and
   aggregate related content for communication to the one or more remote devices based on the identification of the local market media content.

2. The apparatus according to claim 1, further comprising:
   a tangible database having the related content stored therein;
   wherein the program of instructions further enables the apparatus to determine one or more local media markets for which the related content is lacking in said tangible database.

3. The apparatus according to claim 1, wherein the program of instructions further enables the apparatus to perform an identification of the local market media content based upon the received information and consultation of an Internet program guide.

4. The apparatus according to claim 1, wherein the program of instructions further enables the apparatus to automatically obtain the related content based upon the received information and an Internet query.

5. The apparatus according to claim 4, wherein the received information comprises a watermark, audio data and closed caption data.

6. A method comprising:
   instructing, via a network connection, one or more remote devices to enter an information-gathering mode to gather information necessary for identification of local market media content in a particular local media market, wherein the instructing comprises instructing the one or more remote devices to enter the information-gathering mode to gather information necessary for identification of the local market media content on a particular channel in the particular local media market during down time of the one or more remote devices;
   receiving at an electronic device information necessary for identification of local market media content from the one or more remote devices, the one or more remote devices obtaining the information necessary for identification of the local market media content via an input of a connected component media source; and
   aggregating related content for communication to the one or more remote devices based on the identification of local market media content.

7. The method according to claim 6, further comprising:
   storing the related content in a tangible database; and
   determining one or more local media markets for which the related content is lacking in said tangible database.

8. The method according to claim 6, further comprising performing an identification of the local market media content based upon the received information and consultation of an Internet program guide.

9. The method according to claim 8, further comprising automatically obtaining the related content based upon the received information and an Internet query.

10. The method according to claim 9, wherein the received information comprises a watermark, audio data and closed caption data.

11. An apparatus comprising:
    one or more processors;
    a program storage device tangibly embodying a program of instructions that when executed by the one or more processors enables the apparatus to:
    receive an instruction to enter an information-gathering mode to gather information necessary for identification of local market media content in a particular local media market, wherein the instruction comprises an instruction to enter the information-gathering mode to gather information necessary for identification of the local market media content on a particular channel in the particular local media market during down time of the apparatus;

capture information necessary for identification of the local market media content from an input of a connected component media source according to the instruction;

communicate the information necessary for identification of the local market media content to a remote device; and receive related content from the remote device based on the identification of local market media content.

12. The apparatus according to claim 11, wherein the information comprises a watermark, audio data and closed caption data.

13. The apparatus according to claim 11, wherein the local market media content comprises television content within a limited local market, and further wherein the information necessary for identification of local market media content is derived from a component media source and does not include ambient audio derived content.

14. A tangible program storage device, readable by machine, embodying a program of instructions that when executed by a processor of the machine enable the machine to:

receive an instruction to enter an information-gathering mode to gather information necessary for identification of local market media content in a particular local media market, wherein the instruction comprises an instruction to enter the information-gathering mode to gather information necessary for identification of the local market media content on a particular channel in the particular local media market during down time of the apparatus;

capture information necessary for identification of local market media content from an input of a connected component media source;

communicate the information necessary for identification of local market media content to a remote device; and receive related content from the remote device based on the identification of local market media content.

15. The tangible program storage device according to claim 14, wherein the information comprises a watermark, audio data and closed caption data.

* * * * *